No. 893,046.

PATENTED JULY 14, 1908.

L. Y. WILLIAMS.
FISH HOOK.
APPLICATION FILED DEC. 6, 1907.

WITNESSES
Edwin L. Bradford
Ralph Wormelle

INVENTOR
L. Y. Williams
By F. E. Stebbins, Attorney

UNITED STATES PATENT OFFICE.

LACEY Y. WILLIAMS, OF TOLEDO, OHIO.

FISH-HOOK.

No. 893,046.   Specification of Letters Patent.   Patented July 14, 1908.

Application filed December 6, 1907. Serial No. 405,341.

*To all whom it may concern:*

Be it known that I, LACEY Y. WILLIAMS, a citizen of the United States, residing at Toledo, in the county of Lucas and State of Ohio, have invented new and useful Improvements in Fish-Hooks, of which the following is a specification.

The object of my invention is the production of a fish hook, and especially one of the artificial fly variety, wherein the ordinary barb shall be omitted and means employed in lieu thereof which will permit the hook to be removed from the mouth of the fish without seriously injuring the same.

The laws of certain States, as well as the rules of many fishing clubs, provide in effect that fish taken by the angler which are less than a certain length—generally under eight inches—shall be returned to the stream. In conforming to the rules or statutes and when the barbed hook is used its withdrawal from the mouth of the fish in a great majority of cases effects a destructive injury. In lawful angling season dead fish can be seen floating in the streams which have been hooked and returned thereto fatally injured. The use of the barbed hook thus defeats the purpose of the aforesaid rules and laws, that is, to preserve the smaller fish. My purpose is to provide a hook which will sufficiently hold the fish when taken and yet can be removed without seriously injuring the tissues and gills of the fish.

The invention consists in a hook having the metal of the arm bent or offset laterally adjacent the point at the place where the barb is generally located and the said bent or offset portion of the metal presenting a smooth surface.

The accompanying drawing illustrates an example of the physical embodiment of the invention in connection with an artificial fly.

Figure 1:
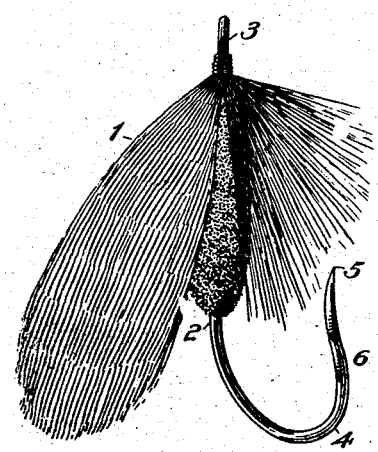
Figure 2:
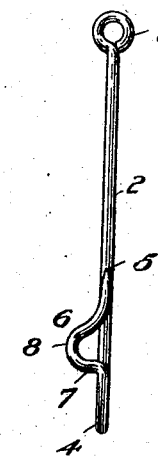

Figure 1 is a side view of the artificial fly and hook. Fig. 2 is an edge view of the hook with the fly removed.

Referring to the figures, the numeral 1 designates the fly; 2, the shank of the hook; 3, the eye for the attachment of the line; 4, the arm bent to a position substantially parallel with the shank; 5, the point; and 6 the lateral offset portion of the metal located below the point and in the place generally occupied by the barb. Preferably the metal at the point 7 extends laterally at substantially a right angle to the arm, then at the point 8 is in the shape of an arc of a circle, and there above curved to the point which is substantially in line with the arm below the offset. This offset portion of the metal has a smooth surface so as not to excessively abrade or cut the flesh or mouth of the fish when being removed. In withdrawing the hook from the mouth of the impaled fish the shank is grasped by the thumb and fingers and turned laterally so as to move the metal at the point 7 towards the opening made by the insertion of the hook, then an outward pressure permits the withdrawal of the point without seriously abrading the flesh or other tissues of the mouth.

What I claim is:

1. An artificial bait comprising a barbless hook having a shank provided with a fly, and an arm with a point and an offset adjacent the point; the surface of the said offset being smooth to prevent injury to the fish when impaled and when the hook is being withdrawn from the mouth.

2. A barbless fish hook having a shank, and an arm provided adjacent the point with a single lateral offset.

3. A fish hook having a shank, and an arm provided adjacent the point with an offset, the metal of the offset remote from the point being disposed substantially at a right angle to the arm, then curved in the shape of an arc of a circle, and there above curved to the point.

In testimony whereof I affix my signature in presence of two witnesses.

LACEY Y. WILLIAMS.

Witnesses:
 PEARL MYGATT,
 MALCOLM E. WILLIAMS.